Sept. 11, 1928.

J. L. GRAY 1,684,377

PRESSURE AND VACUUM RELIEF VALVE

Filed Jan. 13, 1925  2 Sheets-Sheet 1

James L. Gray
Inventor

By his Attorney R. J. Dearborn

Sept. 11, 1928.  1,684,377
J. L. GRAY
PRESSURE AND VACUUM RELIEF VALVE
Filed Jan. 13, 1925   2 Sheets-Sheet 2

Patented Sept. 11, 1928.

1,684,377

UNITED STATES PATENT OFFICE.

JAMES L. GRAY, OF PORT ARTHUR, TEXAS, ASSIGNOR OF ONE-FOURTH TO E. BRUCE, OF GOOSE CREEK, TEXAS.

PRESSURE AND VACUUM RELIEF VALVE.

Application filed January 13, 1925. Serial No. 2,128.

This invention relates to valves and has special significance in relation to valves for apparatus operating under conditions of varying pressure or high temperatures or both.

In the operation of stills for the distillation of hydrocarbon oils sudden changes of pressure may occur and it is for the equalization or relief of such changes that the present invention is intended. Owing to the extreme temperature conditions the pressure and vacuum relief valves connected with stills are very difficult to maintain in proper working order. Frequent repairs are the rule while deposits of carbon derived from escaping oil incrust the valve surfaces. This prevents full closing of the cooperating parts and losses of the light volatile vapors of oil result as distillation of the contents of the still proceeds. Such defects are also highly dangerous because of the possibility of fire. Consequently it is of the greatest importance that such valves be tightly closed and at the same time be able to operate to relieve pressure or vacuum under the conditions at which it is intended.

My invention aims to overcome such difficulties by providing a valve which is positive in its operation but which allows the still to which it is connected to be brought up to operating conditions quickly and be operated thereafter without loss of valuable product. This is accomplished by providing a special type of valve and valve seat and by providing means for removing continuously or periodically deposits of carbonized oil and other foreign matter from the cooperating surfaces.

Figure 1:
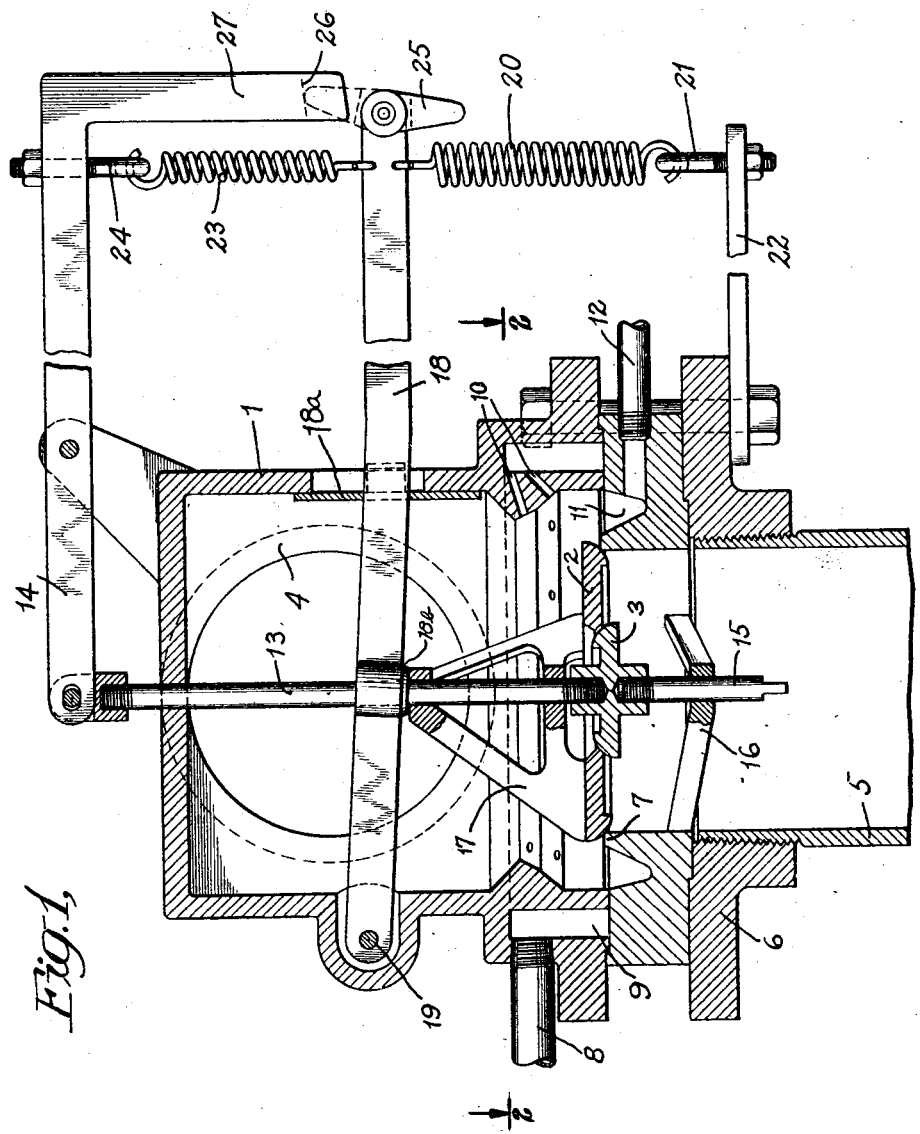
Figure 2:
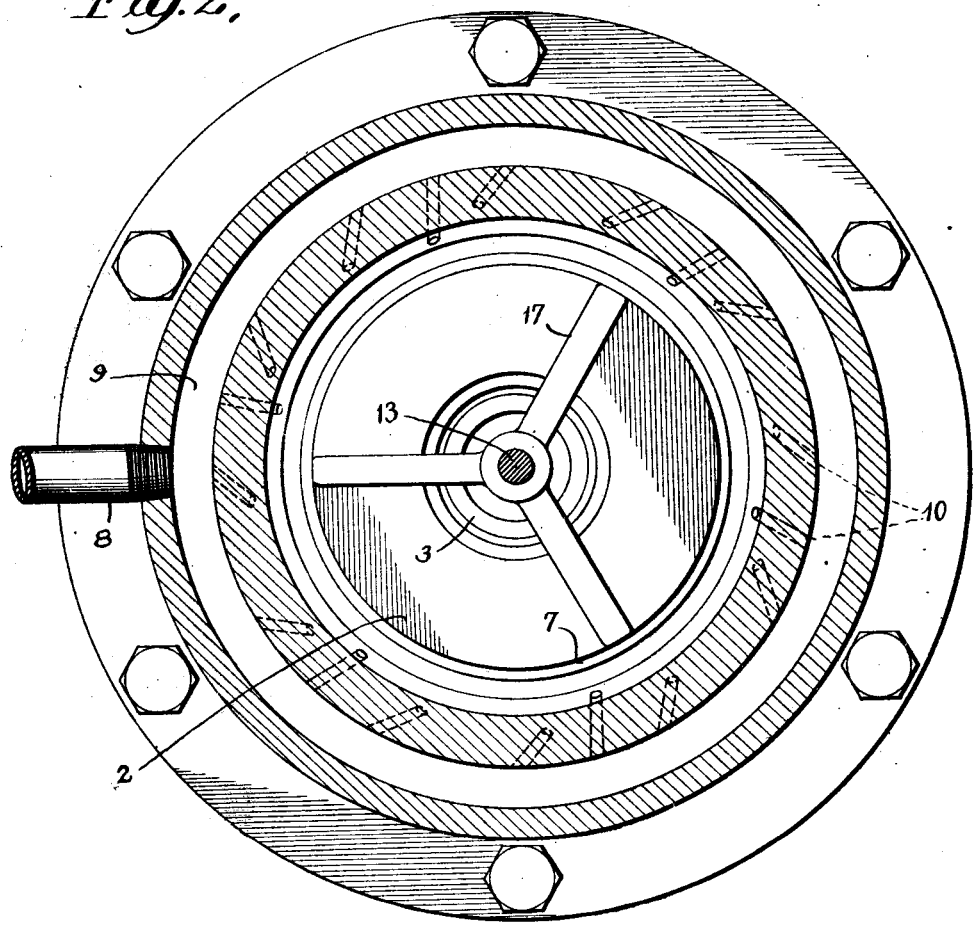

For a more detailed disclosure of my invention reference may be had to the accompanying drawings, Fig. 1 being a partially sectional view of the relief mechanism while Fig. 2 is a cross section of Fig. 1 on the line 2—2. In the drawings, 1 is a valve casing or housing for protecting the pressure relief valve 2 and the vacuum relief valve 3, as well as for carrying off any vapors which may be allowed to escape from these valves through the pipe 4, to be led if desired to a condenser. The pipe 5 serves to directly connect the valve structure with the still and furnishes a support therefor through means of the threaded flange 6. A narrow valve seat 7 is provided for the pressure relief valve, the latter being of the ball and socket type so that it will readily adapt itself to the seat to form a tight seal. A pipe 8 is provided for discharging a cleansing fluid, such as steam, into a chamber 9 which is concentric with the valve opening and formed integral with the valve casing. Discharge openings 10 are provided at intervals around the valve casing and slant downwardly in a direction to cause the cleansing fluid to strike the cooperating surfaces of the pressure relief valve 2 and its seat 7, as well as the seating surfaces of the vacuum relief valve 3. A recess 11 is provided adjacent to and concentric with the valve seat to facilitate the collection of carbon and other foreign matter and permits the oil which may escape and be condensed to be drawn off through pipe 12, together with the waste steam. The vacuum relief valve 3 likewise is of the ball and socket type and is supported by the stem 13 which in turn is connected to the pivoted lever 14. The valve 3 is guided from below by the stem 15, which passes through the spider 16. The valve 2 has upwardly extending portions 17, through which the stem 13 passes to be guided thereby. The upper end of the stem 13 may be guided by arranging it to pass through an opening in the top wall of the casing 1. Valve 2 is held in place by gravity, while pressure may also be exerted against it by the lever 18, which is pivoted to the valve casing at 19, the stem 13 passing through an opening in the lever 18. The lever 18 is preferably formed with a boss 18$^b$ adapted to engage with the valve 2, or with the guide portion 17 thereof, and in order to obtain best results the contacting surfaces of the boss and valve should be substantially flat. A rider or shield 18$^a$ is positioned on lever 18 at the slot in the valve casing 1 through which the lever 18 operates and maintains this slot substantially closed at all times so as to prevent the escape of oil vapors to the atmosphere. A spring 20 is attached near the outer end of lever 18 and anchored by means of the screw 21 which may be secured to any stationary object such as the bracket 22 bolted to the flange 6. Near the outer end of the lever 14 a second spring 23 is attached by means of the screw 24, while the opposing end of the spring 23 is secured to the lever 18. A trigger 25 is pivoted to the outer end of lever 18 and may be raised to the position shown in dotted lines to cooperate with a bevelled surface 26 on the extension 27 of lever 14.

The operation of the device is as follows:—

In starting the operation of the still to which the relief mechanism is attached the trigger 25 is raised to the bevelled surface 26 so as to raise the outer end of lever 14, thus opening the vacuum relief valve 3. The apparatus is allowed to remain in this condition until the still has been brought up to operating conditions. It will be observed that this provides for gradual release of any pressure which may develop in the still during this preliminary stage of operation, but if such sudden pressure develops that the escaping gases cannot pass through the opening of valve 3 rapidly enough to prevent the building up of substantial pressure, the valve 2 will be forced upward against lever 18, which will cause the trigger 25 to trip by slipping off the bevelled surface 26, thus quickly relieving the pressure through valve 2. It will also be observed that spring 23 substantially aids the movement of lever 18 for the spring is under tension when the trigger 25 is bearing against surface 26 and tends to return to normal condition upon the release of the trigger. This provides a very sudden movement of lever 18 to permit the opening of valve 2.

In the normal operation of the still both the pressure and vacuum relief valves are closed and are set to operate at definite pressures by regulation of the tensions on the respective springs. Spring 20 is provided of larger size and is intended to be much stronger than spring 23, so that in opening the vacuum relief valve 3, practically no change is made in the position of spring 20 because of the tension on spring 23.

I prefer to introduce steam under pressure into the chamber 9 for cleansing the valve surfaces from deposited carbon and other foreign matter but it has been found that this is only occasionally desirable since the valve fits tightly even after long continued operation of the still. Other compressed fluids such as carbon dioxide or air might be employed but steam is preferred since it does not support combustion nor unduly cool the valve structure which may be at comparatively high temperature during the operation of the still.

By the application of my invention to stills for the distillation of petroleum and the like an efficient control of the distilling operation is obtained without the fire hazards attendant upon the use of valves heretofore designed, while repairs are found to be only nominal over long periods of operation.

While my invention has been described in particular reference to petroleum stills and is especially well suited therefor, it is obvious that it may be applied to other vessels subject to changes in pressure, such as storage tanks, tank steamers, etc. The specific arrangements chosen to illustrate my invention are not to be construed as limiting the same since various modifications thereof may readily suggest themselves to those skilled in the art.

What I claim is:

1. A combined pressure and vacuum relief mechanism comprising a pressure relief valve, a vacuum relief valve positioned in the face of said first valve and oppositely disposed with respect thereto, means for maintaining said second valve in open position for gradual release of pressure while maintaining said first valve in closed position, and means for automatically releasing said first valve upon development of sudden pressure.

2. A combined pressure and vacuum relief mechanism for stills comprising a pressure relief valve, a vacuum relief valve positioned in the face of said first valve and oppositely disposed with respect thereto, a pivoted lever adapted to exert pressure on said first valve, a spring attached to said lever for normally maintaining said valve in closed position, a pivoted lever connected to said vacuum relief valve, a spring attached at one end to said second lever for maintaining said vacuum relief valve in closed position and at the other end to said first lever for an anchor in substantially opposed relation to said first spring, a trigger at that end of said first lever to which the two springs are attached, adapted to oppose the corresponding end of said second lever in maintaining said vacuum relief valve in an open position and adapted to be tripped upon sudden increase in pressure within the still.

3. A combined pressure and vacuum relief mechanism for stills comprising a pressure relief valve, a vacuum relief valve positioned in the face of said first valve and oppositely disposed with respect thereto, means adapted to cooperate with said first valve to maintain the same in closed position, a pivoted lever connected to said vacuum relief valve, a spring attached at one end to said lever for maintaining said valve in closed position and at the other end to said means for an anchor in substantially opposed relation to the direction of pressure exerted by said means, additional means connected to said first means and cooperating with that end of said lever to which the spring is attached, for maintaining said vacuum relief valve in an open position in opposition to said spring, said means being adapted to be released upon a sudden increase in pressure within the still.

4. A combined pressure and vacuum relief mechanism for stills, comprising a pressure relief valve, a vacuum relief valve positioned in the face of said first valve and oppositely disposed with respect thereto, a pivoted lever adapted to exert pressure on said first valve, a spring attached to said lever for normally maintaining said valve in closed position, a pivoted lever connected to said vacuum relief valve, a spring attached at one end to said second lever for maintaining said vacuum relief valve in closed position and at the other end to said first lever for an anchor in substantially opposed relation to said first spring, said second spring having a strength insufficient to enable it to overcome the tension of said first spring whereby said vacuum relief valve may open in response to a sub-atmospheric pressure within the still without a corresponding movement of said first spring.

5. A combined pressure and vacuum relief mechanism for stills comprising a pressure relief valve, a vacuum relief valve positioned in the face of said first valve and oppositely disposed with respect thereto, means adapted to cooperate with said first valve to maintain the same in a closed position, a pivoted lever connected to said vacuum relief valve, a spring attached at one end to said lever for maintaining said valve in closed position and at the other end to said means for an anchor in substantially opposed relation to the direction of pull exerted by said means, said spring having a strength insufficient to enable it to overcome the pull of said means, whereby said vacuum relief valve may open in response to a sub-atmospheric pressure within the still without a corresponding movement of said means.

In witness whereof I have hereunto set my hand this 2nd day of January, 1925.

JAMES L. GRAY.